(12) United States Patent
Park

(10) Patent No.: US 8,920,001 B2
(45) Date of Patent: Dec. 30, 2014

(54) LIGHT EMITTING DEVICE

(71) Applicant: Samsung Electronics Co., Ltd., Suwon-si (KR)

(72) Inventor: Jong Jin Park, Daejeon (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 0 days.

(21) Appl. No.: 13/869,201

(22) Filed: Apr. 24, 2013

(65) Prior Publication Data

US 2013/0286656 A1    Oct. 31, 2013

(30) Foreign Application Priority Data

Apr. 27, 2012    (KR) .................. 10-2012-0044964

(51) Int. Cl.
  *F21V 5/00*    (2006.01)
  *F21V 7/00*    (2006.01)
  *F21V 13/02*    (2006.01)
(52) U.S. Cl.
  CPC .................................. *F21V 13/02* (2013.01)
  USPC ........... 362/307; 362/235; 362/246; 362/355; 362/311.02
(58) Field of Classification Search
  CPC ........................................ F21V 13/02–13/10
  USPC .............. 362/246, 300, 307, 311.01, 311.02, 362/355–357
  See application file for complete search history.

(56) References Cited

U.S. PATENT DOCUMENTS

| | | | |
|---|---|---|---|
| 2003/0007348 A1* | 1/2003 | Loga et al. | 362/217 |
| 2012/0081630 A1* | 4/2012 | Yokota | 362/249.01 |
| 2012/0200786 A1* | 8/2012 | Kamata | 362/249.01 |
| 2013/0208488 A1* | 8/2013 | Lin et al. | 362/311.02 |
| 2014/0085874 A1* | 3/2014 | Kawagoe et al. | 362/311.01 |

FOREIGN PATENT DOCUMENTS

| | | |
|---|---|---|
| KR | 10-2006-0135109 A | 12/2006 |
| KR | 10-2011-0068552 A | 6/2011 |

* cited by examiner

*Primary Examiner* — Mariceli Santiago
(74) *Attorney, Agent, or Firm* — Sughrue Mion, PLLC

(57) ABSTRACT

A light emitting device includes: a light source that emits light; a reflective unit disposed around a perimeter of the light source and having a reflective surface; and a diffusion unit that is disposed between the light source and the reflective surface and is configured to reflect a partial amount of the light emitted from the light source and transmit another partial amount of the light emitted from the light source toward the reflective surface.

19 Claims, 4 Drawing Sheets

LIGHT EMITTING DEVICE

CROSS-REFERENCE TO RELATED APPLICATIONS

This application claims the priority of Korean Patent Application No. 10-2012-0044964 filed on Apr. 27, 2012, in the Korean Intellectual Property Office, the disclosure of which is incorporated herein by reference in its entirety.

BACKGROUND

1. Field

The present disclosure relates to a light emitting device.

2. Description of the Related Art

A light emitting device configured as a light emitting diode (LED), which emits light according to an electrical signal applied thereto, is widely used as a light emitting source in various electronic products as well as in mobile communications terminals such as mobile phones, personal digital assistants (PDAs), and the like.

In the case of an image display device such as a liquid crystal display (LCD) or the like, a backlight unit for illumination from the rear of a liquid crystal panel is used as a surface light emitting device in order to illuminate the liquid crystal panel and display information thereon. The surface light emitting device is required to increase luminance and is implemented as an evenly surfaced light source to uniformly irradiate light onto the liquid crystal panel, which is important in terms of product quality. High luminance and uniform light emission may be implemented by increasing the number of, and densely disposing, the luminous elements.

However, an increase in the number of luminous elements may disadvantageously result in an increase in manufacturing costs, and a unit for dissipating heat generated from a large number of luminous elements is required, increasing the number of components and leading to the device being complicated.

Various techniques have been developed toward reducing product size according to the trend for products to be reduced in size and thickness, in conjunction with having uniform luminance characteristics.

SUMMARY

Exemplary embodiments provide a light emitting device having enhanced luminance uniformity with a reduced number of luminous elements used as light sources and a thinner configuration, as compared to the related art.

According to an aspect of an exemplary embodiment, there is provided a light emitting device including: a light source that emits light; a reflective unit disposed around a perimeter of the light source and having a reflective surface; and a diffusion unit disposed between the light source and the reflective surface and is configured to reflect a partial amount of the light emitted from the light source and transmit another partial amount of the light emitted from the light source toward the reflective surface.

The diffusion unit may have a slope and be slanted with respect to a bottom surface of the light emitting device on which the light source is mounted, and an amount of light transmitted through the diffusion unit is adjusted by altering the slope of the diffusion unit.

The slope of the diffusion unit may be equal to or greater than a slope of the reflective surface.

The diffusion unit may be made of a material obtained by dispersing light reflective particles in a silicon or epoxy resin.

The diffusion unit may include a first diffusion unit and a second diffusion unit.

The reflective surface and the diffusion unit may be disposed at two sides of the light source and are symmetrical, centered on the light source.

The light emitting device may further include a diffusion plate disposed above the light source and the diffusion unit.

The diffusion plate and the diffusion unit may be made of the same material.

The diffusion unit may diffuse the other partial amount of light transmitted through the diffusion unit toward the reflective surface.

The light source may include a substrate and a plurality of luminous elements mounted and arranged on the substrate.

The light source may include a linear light source.

The reflective unit may be made of a metal.

According to an aspect of another exemplary embodiment, there is provided a light emitting device including: a light source which emits light; a reflective housing which houses the light source; and a diffuser disposed within the reflective housing which diffuses a portion of the light at edges of the reflective housing and refracts the diffused light towards the reflective housing.

According to an aspect of another exemplary embodiment, there is provided a light emitting device including: a light source which emits light; a reflective housing which houses the light source; a first diffusion plate which reflects part of the light towards a target destination, and diffuses and refracts another part of the light as diffused light; and a second diffusion plate which reflects part of the diffused light towards the target destination, and transmits and re-diffuses another part of the diffused light towards the reflective housing to be reflected towards the target destination.

BRIEF DESCRIPTION OF THE DRAWINGS

The above and/or other aspects will be more clearly understood from the following detailed description taken in conjunction with the accompanying drawings, in which.

DETAILED DESCRIPTION OF THE EXEMPLARY EMBODIMENTS

Figure 1:
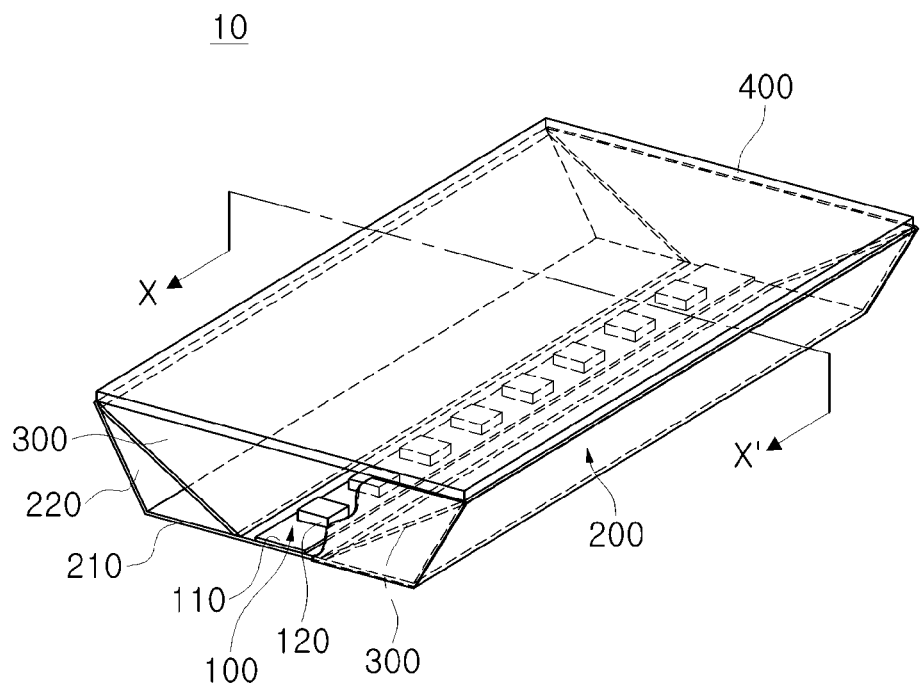
FIG. 1 is a perspective view schematically illustrating a light emitting device according to an exemplary embodiment.

Exemplary embodiments of the present disclosure will now be described in detail with reference to the accompanying drawings.

The exemplary embodiments may, however, be embodied in many different forms and should not be construed as being limited to the exemplary embodiments set forth herein.

Rather, these exemplary embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like components.

Figure 2:
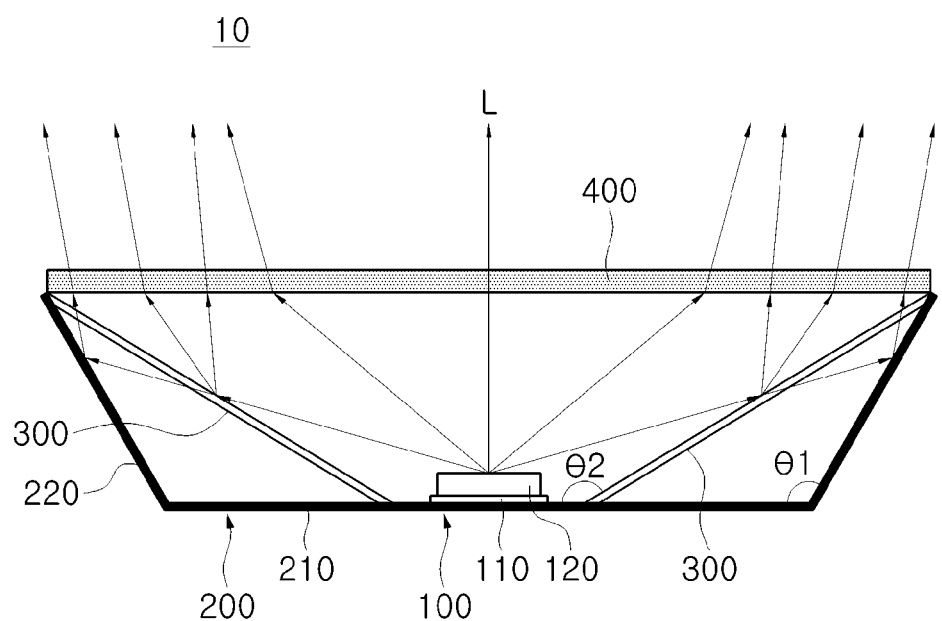
FIG. 2 is a cross-sectional view of the light emitting device of FIG. 1.
Figure 3A:
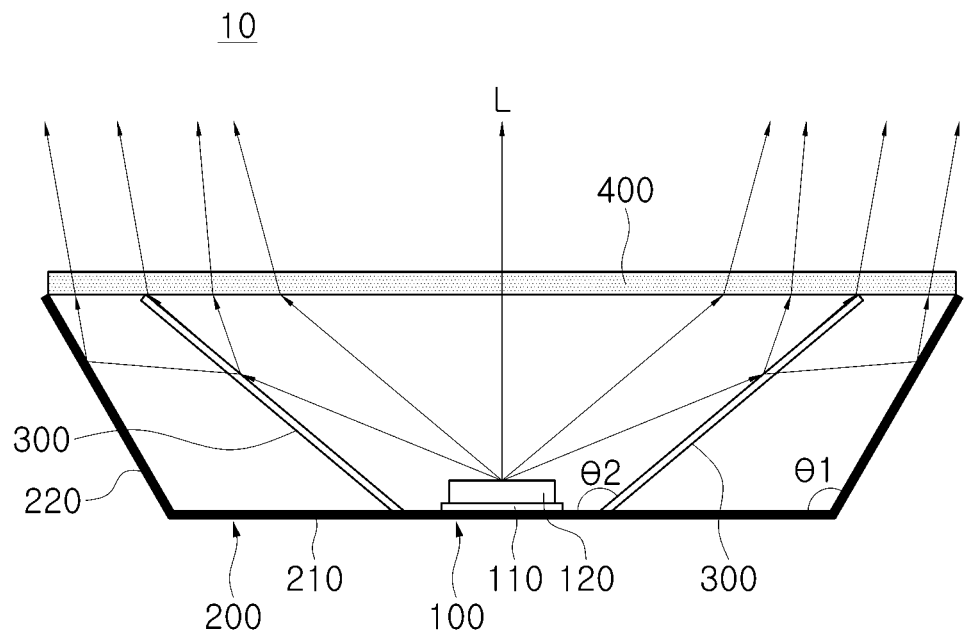
FIGS. 3A and 3B are cross-sectional views schematically showing structures in which a slope of a diffusion unit is altered in the light emitting device of FIG. 1.
Figure 3B:
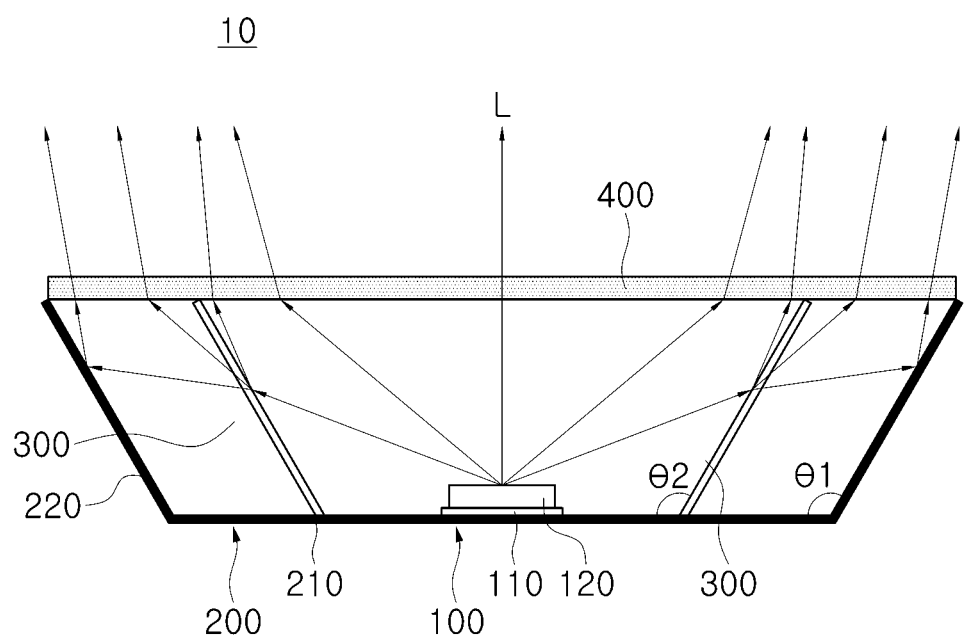
Figure 4:
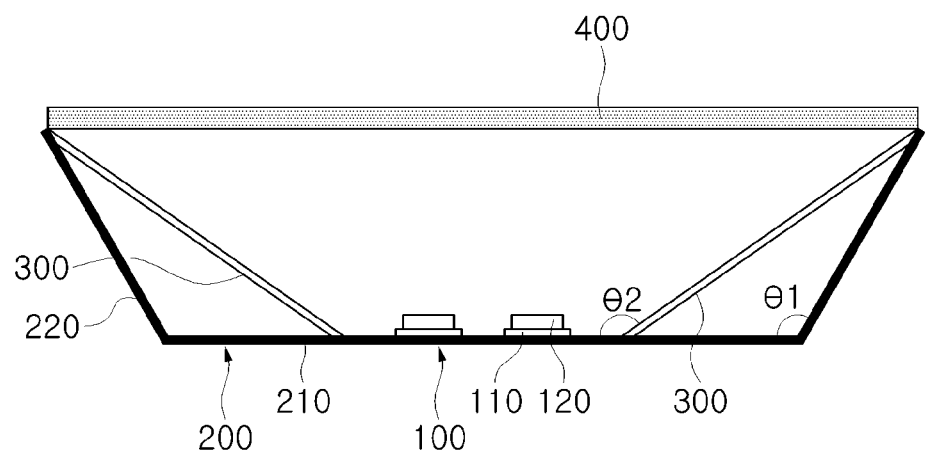
FIG. 4 is a view schematically illustrating a structure having a plurality of light sources in the light emitting device of FIG. 1.

A light emitting device 10 according to an exemplary embodiment of the present disclosure will be described with reference to FIGS. 1 through 4. FIG. 1 is a perspective view schematically illustrating a light emitting device according to an exemplary embodiment. FIG. 2 is a cross-sectional view of the light emitting device of FIG. 1. FIGS. 3A and 3B are cross-sectional views schematically showing structures in which a slope of a diffusion unit is altered in the light emitting device of FIG. 1. FIG. 4 is a view schematically illustrating a structure having a plurality of light sources in the light emitting device of FIG. 1.

With reference to FIGS. 1 through 4, the light emitting device 10 according to an exemplary embodiment includes a light source 100, a reflective unit (or reflective housing) 200, and a diffusion unit (or diffuser) 300, and further includes a diffusion plate 400 disposed above the light source 100 and the diffusion unit 300.

The light source 100 may include a substrate 110 and a plurality of luminous elements 120 mounted and arranged on the substrate 110.

The substrate 110 may be implemented as a type of a printed circuit board (PCB), and may be made of an organic resin material containing epoxy, triazine, silicon, polyimide, or the like, or any other organic resin materials. Also, the substrate 110 may be made of a ceramic material such as AlN, Al2O3, or the like, or may be made of metal or a metal compound. For example, the substrate 110 may include a metal PCB, a metal core PCB (MCPCB), or the like. The substrate 110 may be formed to have a bar-like shape having a certain length, and accordingly, the light source 100 may have a structure of a linear light source.

The luminous element 120 may be implemented as a type of a semiconductor element that emits light having a certain wavelength according to an electrical signal, i.e., power, applied thereto from the outside, and may include a light emitting diode (LED). The luminous element 120 may generate blue light, red light, and green light according to a material contained therein, or may generate white light. A plurality of luminous elements 120 may be arranged in a row on the bar-shaped substrate 110 to form a linear light source. In this case, the luminous elements 120 may be homogeneous luminous elements that generate light having the same wavelength or heterogeneous luminous elements that generate light beams each having a different wavelength. The luminous element 120 may be implemented as an LED chip or may be implemented as a single package unit having an LED chip housed therein. When the luminous element 120 is implemented as an LED chip, a wavelength conversion layer for converting a wavelength of light may be provided on the luminous element 120.

In the present exemplary embodiment, a single light source 100 is shown as being provided, but the present disclosure is not limited thereto and a plurality of light sources 100 may be connected to form a single linear light source according to other exemplary embodiments. Also, as shown in FIG. 4, one or more rows of light sources 100 may be provided.

The reflective unit 200 is a type of a housing having a box-like structure on which the light source 100 is mounted and which supports the light source 100. The reflective unit 200 includes a bottom surface 210 on which the light source 100 is placed and a reflective surface 220 disposed around a perimeter of the light source 100 to reflect light.

The reflective unit 200 may be made of a material able to stably support the light source 100 and easily dissipate heat generated from the light source 100 to the outside. For example, the reflective unit 200 may be made of a metal. The reflective unit 200 may include a reflective layer made of a material having high light reflectivity, formed on an inner surface thereof.

According to an exemplary embodiment, the reflective surface 220 is implemented as a pair of reflective surfaces 220 disposed at both sides of the light source 100, each of the reflective surfaces 220 extending in parallel in a length direction of the light source 100, having a certain slope $\theta1$, and being slanted toward the light source 100. For example, the pair of reflective surfaces 220 extending from both end portions of the bottom surface 210 of the reflective unit 200 in an upward direction may be slanted at a slope having an obtuse angle, rather than a right angle, with respect to the bottom surface 210. The pair of slanted reflective surfaces 220 may be symmetrical, centered on the light source 100. Through such a structure of the reflective surfaces 220, the reflective unit 200 may have a type of a reflective cup structure.

The diffusion unit 300 is disposed between the light source 100 and the slanted reflective surface 220, reflects a partial amount of light irradiated from the light source 100 while allowing another partial amount of light to be transmitted and diffused to the reflective surface 220. The diffusion unit 300 may be implement by two diffusion plates arranged on opposite sides of the light source. The diffusion unit 300 may be made of a material having light transmissivity such as a silicon or epoxy resin and may contain light reflective particles therein.

As illustrated in FIGS. 1 and 2, similar to the slanted reflective surface 220, the diffusion unit 300 may be disposed to be parallel with the light source 100 in the length direction and on both sides thereof. Also, similar to the reflective surface 220, the diffusion unit 300 may be symmetrical, centered on the light source 100.

According to an exemplary embodiment, the diffusion unit 300 may be slanted at a slope having an obtuse angle with respect to the bottom surface 210 of the reflective unit 200. Namely, similar to the reflective surface 220, the diffusion unit 300 may have a slope $\theta2$ having a certain value and may be disposed to be slanted with regard to the light source 100. In this case, the slope $\theta2$ of the diffusion unit 300 may have a value at least equal to or greater than the slope $\theta1$ of the reflective surface 220.

A partial amount of light irradiated from the light source 100 and traveling towards a central region of the reflective unit 200, through the diffusion unit 300 disposed to have the foregoing structure, and to the reflective surface 220 at the edges is reflected by the diffusion unit 300 midway, to proceed in an upward direction. The remaining amount of light transmitted through the diffusion unit 300 is refracted and diffused by the diffusion unit 300 and then reflected by the reflective surface 200 to proceed in the upward direction. Specifically, a partial amount of light irradiated from the light source 100 towards a central portion of the reflective unit 200 and toward the edges is emitted to the outside by being reflected off the diffusion unit 300 at positions adjacent to the edge region, and the remaining amount of light is emitted to the outside by being reflected off the reflective surface 220 at the edge region. In this manner, since light is emitted in a dual manner from the edge region which has a relatively low luminance in comparison to the central region in which the light source 100 is positioned, luminance of the edge region can be increased as emitted beams of light overlap. In particular, light reaching the reflective surface 220 after being transmitted through the diffusion unit 300 is in a state of having been diffused by the diffusion unit 300, and since light in a uniformly diffused state is reflected by the reflective surface 220 to the outside, luminance of the edge region can achieve a high amount of uniformity. Thus, a difference between luminance of the central region and luminance of the edge region is reduced, enhancing uniformity of overall luminance.

In order to enhance uniformity of luminance through the diffusion unit 300, it is important to appropriately adjust an amount of light transmitted through the diffusion unit 300. Namely, if the amount of light transmitted through the diffusion unit 300 is too small, luminance of the edge region is lowered and a dark portion, or the like, is generated in the edge region. Also, if the amount of light transmitted through the diffusion unit 300 is too large, the amount of light emitted upon being reflected by the diffusion unit 300 is reduced, and thus, luminance of the edge region is lowered as in a case of a structure without the diffusion unit 300, and further causing a problem in that luminance is not uniform overall.

Thus, it is important to appropriately adjust the amount of light transmitted through the diffusion unit 300. In the present exemplary embodiment, as shown in FIGS. 3A and 3B, the amount of light transmitted through the diffusion unit 300 may be adjusted by altering the slope θ2 of the diffusion unit 300. In detail, by altering the slope θ2 of the diffusion unit 300, an angle of incident light, which is emitted from the light source 100 and made incident to the diffusion unit 300, may be changed, and as the incident angle is changed, light may be completely reflected from the surface of the diffusion unit 300 so as to be emitted to the outside, or may be refracted through the diffusion unit 300 and reflected from the reflective surface 220. Thus, the amount of light transmitted through the diffusion unit 300 may be adjusted by appropriately altering the slope θ2 of the diffusion unit 300.

The diffusion plate 400 is disposed above the light source 100 and the diffusion unit 300 to directly transmit or diffuse light emitted from the light source, or transmit or diffuse light emitted upon being reflected by the diffusion unit 300 or light emitted upon being reflected by the reflective surface 220. Accordingly, light emitted upwardly from the reflective unit 200 may be emitted to have a more uniform overall luminance. The diffusion plate 400 may be made of the same material as that of the diffusion unit 300, although is not limited thereto. Thus, since the light source 100 is three-dimensionally covered on the upper side and lateral sides thereof by the diffusion plate 400 and the diffusion unit 300, light emitted from the light source 100 can be diffused entirely.

A light emitting device 10' according to another exemplary embodiment will be described with reference to FIG. 5. The configuration of the light emitting device 10' according to the exemplary embodiment illustrated in FIG. 5 has substantially the same basic structure as that of the exemplary embodiment illustrated in FIGS. 1 through 4, except that the light emitting device 10' includes a diffusion unit 300'. Thus, a description of the same parts as those of the foregoing exemplary embodiment illustrated in FIGS. 1 through 4 will be omitted and the configuration of the diffusion unit 300' will be described.

Figure 5:
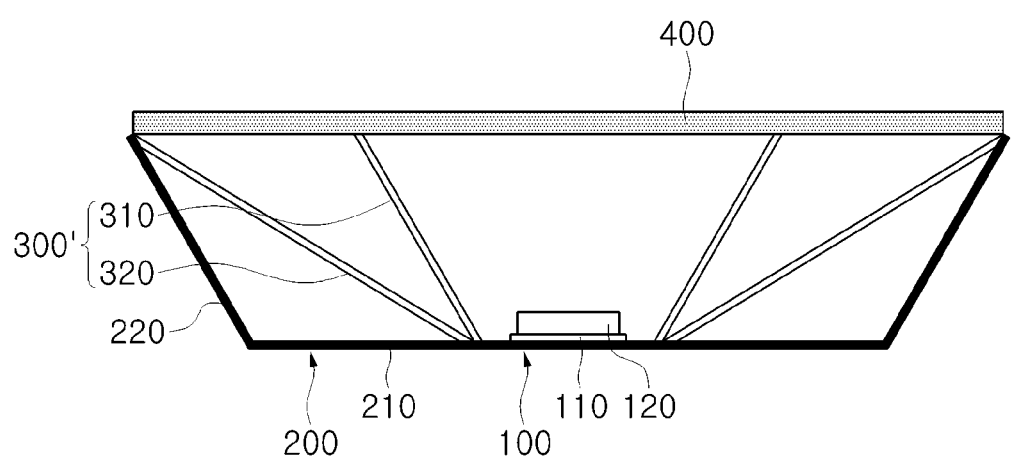
FIG. 5 is a perspective view schematically illustrating a light emitting device according to another exemplary embodiment.

FIG. 5 is a perspective view schematically illustrating a light emitting device 10' according to another exemplary embodiment.

Figure 6:
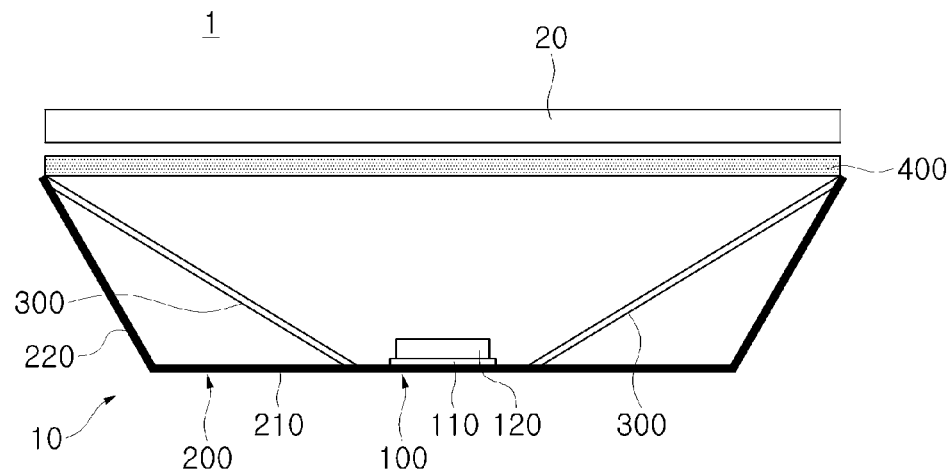
FIG. 6 is a view schematically illustrating an image display device employing the light emitting device of FIG. 1.

As shown in FIG. 5, the diffusion unit 300' includes a first diffusion unit 310 and a second diffusion unit 320. The first diffusion unit 310 and the second diffusion unit 320 may be slanted with regard to the light source 310 at different slopes. With this configuration, a partial amount of light irradiated toward the reflective surface 220 is reflected by the first diffusion unit 310, and another partial amount of light is transmitted and diffused to the second diffusion unit 320. Also, of the light transmitted and diffused to the second diffusion unit 320, a partial amount of light is reflected by the second diffusion unit 320, and another partial amount of light is transmitted and diffused to the reflective surface 220. Through the sequential reflecting, transmitting, and diffusing process, light discharged from the reflective unit 200 according to the exemplary embodiment shown in FIG. 5 may be emitted to have a more uniform luminance overall. It is understood that the number and arrangement of diffusion units may be varied according to other exemplary embodiments FIG. 6 is a view schematically illustrating an image display device employing the light emitting device of FIG. 1, and FIG. 7 is a view schematically illustrating an illumination system employing the light emitting device of FIG. 1.

The light emitting device configured as described above with respect to FIG. 1 may be employed as a light emitting source of an image display device 1 or an illumination system 2. As illustrated in FIG. 6, a liquid crystal panel 20 may be disposed above the light emitting device 10, and the light emitting device 10 may irradiate light to the liquid crystal panel 20.

Figure 7:
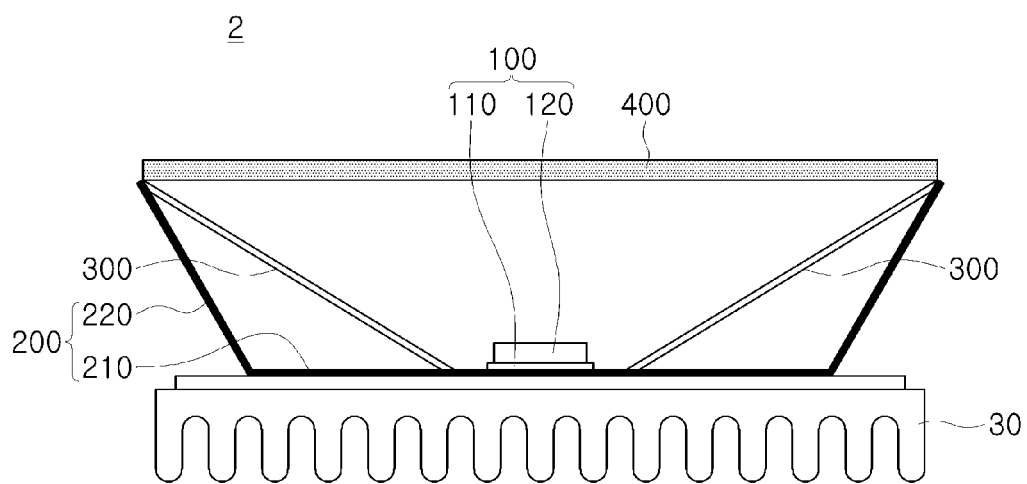
FIG. 7 is a view schematically illustrating an illumination system employing the light emitting device of FIG. 1.

Also, as illustrated in FIG. 7, the light emitting device 10 may be fastened to a heat sink 30 so as to be used in an illumination system 2, such as, for example, a courtesy light, a vehicle headlight, or the like, As set forth above, according to exemplary embodiments, a light emitting device which has enhanced uniformity of luminance, a smaller number of luminous elements used as light sources, and a thinner configuration as compared to the related art can be provided.

While exemplary embodiments have been shown and described, it will be apparent to those skilled in the art that modifications and variations can be made without departing from the spirit and scope of the inventive concept as defined by the appended claims.

What is claimed is:

1. A light emitting device comprising:
    a light source that emits light;
    a reflective unit disposed around a perimeter of the light source and having a reflective surface; and
    a diffusion unit that is disposed between the light source and the reflective surface, and configured to reflect a partial amount of the light emitted from the light source and transmit another partial amount of the light emitted from the light source toward the reflective surface,
    wherein the diffusion unit has a slope and is slanted with respect to a bottom surface of the light emitting device on which the light source is mounted, and an amount of light transmitted through the diffusion unit is adjusted by altering the slope of the diffusion unit.

2. The light emitting device of claim 1, wherein the slope of the diffusion unit is equal to or greater than a slope of the reflective surface.

3. The light emitting device of claim 1, wherein the diffusion unit is made of a material obtained by dispersing light reflective particles in a silicon or epoxy resin.

4. The light emitting device of claim 1, wherein the diffusion unit comprises a first diffusion unit and a second diffusion unit.

5. The light emitting device of claim 1, wherein the reflective surface and the diffusion unit are disposed at two sides of the light source and are symmetrical, centered on the light source.

6. The light emitting device of claim 1, further comprising a diffusion plate disposed above the light source and the diffusion unit.

7. The light emitting device of claim 6, wherein the diffusion plate and the diffusion unit are made of a same material.

8. The light emitting device of claim 1, wherein the diffusion unit diffuses the other partial amount of light transmitted through the diffusion unit toward the reflective surface.

9. The light emitting device of claim 1, wherein the light source comprises a substrate and a plurality of luminous elements mounted and arranged on the substrate.

10. The light emitting device of claim 9, wherein the light source comprises at least one linear light source.

11. The light emitting device of claim 1, wherein the reflective unit is made of a metal.

12. A light emitting device comprising:
a light source that emits light;
a reflective housing that houses the light source; and
a diffuser disposed within the reflective housing and configured to diffuse a portion of the light at edges of the reflective housing and refract the diffused light towards the reflective housing,
wherein the diffuser has a slope and is slanted with respect to a bottom surface of the light emitting device on which the light source is mounted, and the slope of the diffuser is equal to or greater than a slope of a reflective surface of the reflective housing.

13. The light emitting device of claim 12, wherein the diffuser comprises a diffusion plate formed of a silicon or epoxy resin and containing light reflective particles.

14. The light emitting device of claim 13, wherein the light source is mounted on a bottom surface of the reflective housing, and an angle between an area of the bottom surface at which the light source is mounted and the diffusion plate comprises an obtuse angle.

15. The light emitting device of claim 12, wherein the diffuser reflects another portion of the light at the edges towards a target destination.

16. The light emitting device of claim 15, wherein the target destination is a liquid crystal panel disposed above the light emitting device.

17. The light emitting device of claim 12, wherein the reflective housing is cup shaped.

18. A light emitting device, comprising:
a light source which emits light;
a reflective housing which houses the light source;
a first diffusion plate which reflects part of the light towards a target destination, and diffuses and refracts another part of the light as diffused light; and
a second diffusion plate which reflects part of the diffused light towards the target destination, and transmits and re-diffuses another part of the diffused light towards the reflective housing to be reflected towards the target destination,
wherein the first and second diffusion plates have a slope and are slanted with respect to a bottom surface of the light emitting device on which the light source is mounted, and an amount of light transmitted through the first and second diffusion plates are adjusted by altering the slope of the first and second diffusion plates, respectively.

19. The light emitting device of claim 18, further comprising a third diffusion plate disposed above the light source and the first and second diffusion plates and below the target destination.

* * * * *